United States Patent Office 2,923,978
Patented Feb. 9, 1960

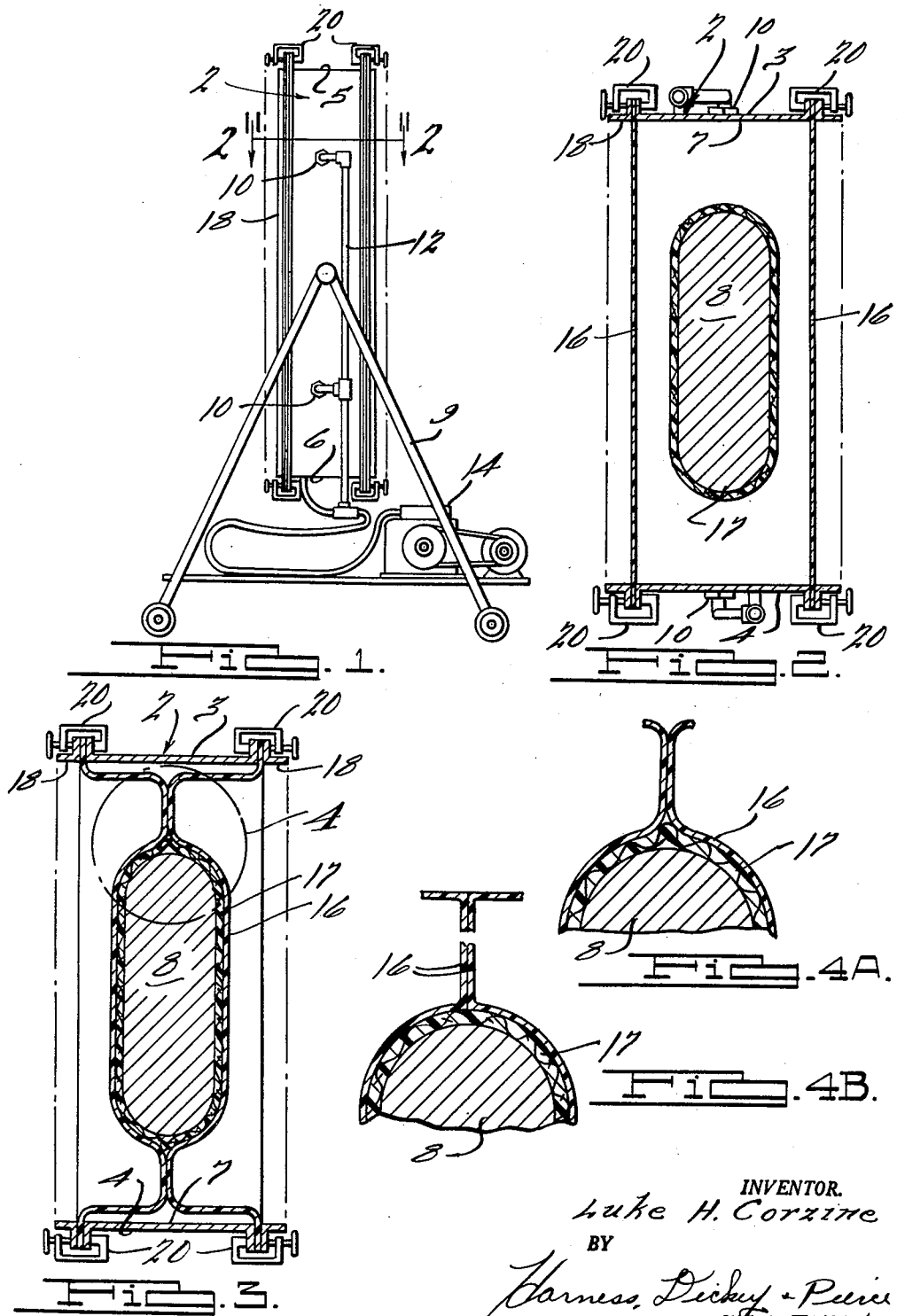

2,923,978

VACUUM BAG MOLDING METHOD

Luke H. Corzine, Huntington Park, Calif., assignor to Raymond De-Icer & Engineering Company, Los Angeles, Calif., a partnership Application January 26, 1956, Serial No. 561,494

2 Claims. (Cl. 18—56)

This invention relates to an improved method for vacuum bag molding of glass fiber reinforced resins.

Vacuum bag molding is an advantageous process for molding glass fiber reinforced resin bodies and particularly for such bodies of relatively large size. Heretofore, the process of vacuum bag molding has been subjected to a disadvantage in that in molding relatively large articles the vacuum bag often wrinkled and collapsed unevenly upon the lay-up. Accordingly, a relatively high degree of skill was often required to insure that the bag spread evenly and smoothly over the surface of the lay-up. Wrinkles in the bag are undesirable because they tend to form notches in the molded articles and thus weaken them.

Accordingly, an object of the instant invention is to overcome disadvantages in prior vacuum bag molding methods and to provide an improved vacuum bag molding method for molding glass fiber reinforced resins.

Another object of the present invention is to provide an improved method for vacuum bag molding of glass fiber reinforced resin bodies by means of which a vacuum bag diaphragm may be stretched smoothly over a lay-up without wrinkling or folding.

Another object of the present invention is to reduce the cost of molding relatively large bodies of glass fiber reinforced resins.

Still another object of the present invention is to provide improved vacuum bag molding apparatus that is economical to manufacture and assemble, efficient and reliable in operation.

These and other objects are accomplished by the instant invention according to which a glass fiber reinforced resin body is molded within a chamber defined by a plurality of stretchable, flexible, elastic sheets and a rigid frame which serves to support the sheets. The sheets are initially stretched lightly over the frame and then stretched evenly and smoothly over the surface of the lay-up by reducing the pressure in the chamber. Since the sheets stretch evenly and smoothly, they press the lay-up upon the mold without wrinkling or creating overlapping folds that might produce notches in the lay-up.

The invention will be described in greater detail in connection with the accompanying drawing in which:

Figure 1 is a side elevational view of apparatus embodying the present invention;

Fig. 2 is a sectional view of the apparatus illustrated in Figure 1, taken on the line 2—2 thereof;

Fig. 3 is a sectional view of the apparatus illustrated in Figure 1, also taken along the line 2—2 thereof and illustrating one step in the process of bag molding according to the invention; and Figs. 4a and 4b are partial views of the apparatus shown in Fig. 3, showing a portion thereof designated by the circle 4 and illustrating two successive steps in bag molding according to the invention.

Referring to the drawing, apparatus embodying the invention is shown comprising a frame, generally designated 2, which includes spaced substantially parallel side members 3 and 4 integrally joined by spaced substantially parallel top and bottom members 5 and 6, the frame 2 defining the top, bottom and side walls of a chamber 7 sufficiently large fully to enclose a mold 8 upon which the glass fiber reinforced resin bodies are to be laid up. The frame 2 is supported by an A frame supporting structure 9 which serves to raise the frame to the desired working level. A plurality of exhaust ports 10 extend through the frame 2 at convenient points around the periphery thereof and exhaust tubes 12 are provided which are connected to the exhaust ports 10 and to a vacuum pump 14 so that the chamber 7 may be exhausted of air.

A resin body may be molded upon the mold 8 according to the invention by first laying up a layer 17 of fiber glass and resin on the mold 8. For the purposes of the instant invention it is immaterial whether the fiber glass is in the form of fabric, mat, roving, glass yarn reinforced paper, or fibrous glass preforms. The nature of the resin also is not critical in the practice of the instant invention. Any of many known resins, such as polyesters, epoxies and melamines may be used in conjunction with known catalysts or accelerators, as desired. Conveniently, a polyester resin may be used together with any catalyst capable of causing polymerization of the resin under ultraviolet light excitation.

After the glass fiber and the resin are laid up upon the mold, the chamber 7 is completely sealed by stretching sheets 16 of a stretchable, elastic material, such as polyvinyl acetate or polyvinyl alcohol, lightly across the open ends of the frame 2. The sheets 16 may be held in place across the open ends of the frame by angle iron members 18 and C-clamps 20, or by any other convenient means. After the chamber 7 is completely sealed with the vinyl sheeting 16, the chamber is exhausted of air by the vacuum pump 14 down to about 22 to 27 inches of mercury. As the chamber 7 is evacuated, the sheets 16 collapse upon the mold to press the lay-up against the mold. Since the sheets 16 are elastic and are held firmly at their edges, they deform only by stretching and thus do not wrinkle or tend to form creases and folds that would impress notches into the lay-up. After the chamber has been exhausted, the lay-up is inspected for bubbles or any other visible imperfections and may be rubbed down lightly with a rubber block, for example, to move such imperfections. The resin is then cured by exposing it to ultraviolet light radiation, or by heating it either by an electric resistance heater placed inside the mold, or by infra red lamps directed upon the lay-up from outside.

After the resin is cured, the vacuum is released and the vinyl sheets are stripped from the lay-up. The complete process may be repeated as often as desired to produce a laminated molded body of as many laminations as required for the strength desired in the final product.

As shown in Fig. 3, which is exaggerated for purposes of illustration, the edges of the lay-up tend to form flash lines at the junction of the two opposed sheets 16. These flash lines may be minimized as illustrated in Figs. 4a and 4b by heat sealing the abutting surfaces of the sheets 16 adjacent to the flash lines after the frame is exhausted, but before curing the resin. After the sheets are sealed, they are cut to relieve the tension upon them and to allow them to collapse over the flash line to reduce it to insignificant dimensions. The resin is then cured.

The nature of the sheeting material is critical in the practice of the invention only insofar as its stetchability, flexibility and elasticity are concerned. These properties are essential, but the character of the sheeting may be otherwise varied as desired. It may, for example, be made of rubber or cellulose acetate, and its thickness may be varied within wide limits determined only by the requirements of flexibility and stretchability. The use of vinyl polymer sheeting is preferred, however, because it is transparent both to visible and to ultraviolet light, and because it does not tend to adhere to the molding resins ordinarily used. These properties facilitate visual inspection and supervision of the lay-up during the molding process, and permit ultraviolet radiation curing of the resin. Moreover, after the resin is cured, the vinyl sheeting may be readily stripped from the laminate. The sheet is also preferably a non-porous film in order to minimize air leakage through it and to minimize the quantity of air that must be exhausted from the frame to generate adequate molding pressure.

What is claimed is:

1. The method of molding reinforced plastics which comprises the steps of placing a curable reinforced plastic upon a male mold, supporting a pair of stretchable elastic sheets along the margins thereof in spaced relationship on opposite sides of the mold, enclosing the space between said sheets to form a chamber surrounding said mold, reducing the pressure between the sheets while holding the marginal portions of said sheets in a fixed position so that the ambient atmospheric pressure stretches said sheets and presses the sheets against the material on the mold, said sheets being of sufficient size to completely enclose said mold when they are so stretched and to come into contact with each other along opposite sides of said mold, sealing said sheets together where they so contact each other, and severing the sealed portions from the supported margins of said sheets to allow said sealed portions to collapse upon said mold whereby the flash produced on said plastic along the meeting line of said sheets is reduced.

2. The method of molding reinforced plastics which comprises the steps of placing a curable reinforced plastic upon a male mold, supporting a pair of stretchable elastic sheets in spaced substantially parallel relationship on opposite sides of the mold, reducing the pressure between the sheets while holding the margins of said sheets in a fixed position so that the ambient atmospheric pressure stretches said sheets and presses them against the plastic on the mold, said sheets being of sufficient size to completely enclose said mold when they are so stretched and to come into contact with each other along opposite sides of said mold, sealing said sheets together where they so contact each other, severing the sealed portions of the sheets from the margins thereof to allow said sealed portions to collapse upon said mold whereby the flash produced on said plastic along the meeting line of said sheets is reduced, and thereafter curing the plastic to form a molded article.

References Cited in the file of this patent

UNITED STATES PATENTS

| 1,949,472 | Hopkinson | Mar. 6, 1934 |
| 2,054,864 | Owen | Sept. 22, 1936 |
| 2,392,108 | Vidal et al. | Jan. 1, 1946 |
| 2,411,497 | Barnes | Nov. 26, 1946 |
| 2,429,122 | Crowley | Oct. 14, 1947 |
| 2,441,097 | Hicks | May 4, 1948 |

UNITED STATES PATENT OFFICE
CERTIFICATE OF CORRECTION

Patent No. 2,923,978                           February 9, 1960

Luke H. Corzine

It is hereby certified that error appears in the printed specification of the above numbered patent requiring correction and that the said Letters Patent should read as corrected below.

Column 1, lines 20 and 21, for "subjected" read --subject --; column 2, line 48, for "move" read -- remove --; line 69, for "stetchability" read -- stretchability --; column 4, line 8, after "mold," insert -- enclosing the space between said sheets to form a chamber surrounding said mold, --.

Signed and sealed this 9th day of August 1960.

(SEAL)
Attest:

KARL H. AXLINE
Attesting Officer

ROBERT C. WATSON
Commissioner of Patents